(12) United States Patent
Kamakura

(10) Patent No.: US 12,399,373 B2
(45) Date of Patent: Aug. 26, 2025

(54) IMAGE DISPLAY DEVICE

(71) Applicant: SEIKO EPSON CORPORATION, Tokyo (JP)

(72) Inventor: Kazuya Kamakura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 637 days.

(21) Appl. No.: 17/587,222

(22) Filed: Jan. 28, 2022

(65) Prior Publication Data

US 2022/0244548 A1 Aug. 4, 2022

(30) Foreign Application Priority Data

Jan. 29, 2021 (JP) ................................. 2021-012680

(51) Int. Cl.
G02B 27/01 (2006.01)

(52) U.S. Cl.
CPC .. G02B 27/0176 (2013.01); *G02B 2027/0178* (2013.01)

(58) Field of Classification Search
CPC .... G02B 27/01–0189; G02B 2027/0105–0198
See application file for complete search history.

(56) References Cited

U.S. PATENT DOCUMENTS

| | | | |
|---|---|---|---|
| 2002/0158813 A1 | 10/2002 | Kiyokawa et al. | |
| 2008/0186586 A1 | 8/2008 | Yamamoto | |
| 2015/0177522 A1* | 6/2015 | Yajima | G09G 3/3208 345/8 |
| 2016/0179148 A1 | 6/2016 | Takagi et al. | |
| 2016/0212889 A1* | 7/2016 | Nikkhoo | H05K 7/20963 |
| 2017/0097509 A1 | 4/2017 | Yoshida | |
| 2017/0227779 A1* | 8/2017 | Kato | H04N 5/64 |
| 2017/0237935 A1 | 8/2017 | Totani et al. | |
| 2018/0017798 A1 | 1/2018 | Yoshida | |
| 2018/0373035 A1* | 12/2018 | Yee | G02B 6/005 |
| 2020/0073125 A1 | 3/2020 | Kimura et al. | |

FOREIGN PATENT DOCUMENTS

| | | |
|---|---|---|
| CN | 110873965 A | 3/2020 |
| JP | 2001-281593 A | 10/2001 |
| JP | 2004-287190 A | 10/2004 |
| JP | 2006-054618 A | 2/2006 |
| JP | 2016-054468 A | 4/2016 |
| JP | 2016-195313 A | 11/2016 |
| JP | 2017-063322 A | 3/2017 |
| JP | 2018-054979 A | 4/2018 |
| WO | 2015/083316 A1 | 6/2015 |
| WO | 2019/225759 A1 | 11/2019 |

* cited by examiner

*Primary Examiner* — Christopher A Lamb, II
(74) *Attorney, Agent, or Firm* — Oliff PLC

(57) ABSTRACT

A display element including a light emitting portion of imaging light, an optical system configured to emit imaging light from the display element, a resin-made cover member configured to cover the optical system, and a heat dissipation material attached from the cover member to the display element and configured to conduct heat of the display element to the cover member are included.

12 Claims, 13 Drawing Sheets

IMAGE DISPLAY DEVICE

The present application is based on, and claims priority from JP Application Serial Number 2021-012680, filed Jan. 29, 2021, the disclosure of which is hereby incorporated by reference herein in its entirety.

BACKGROUND

1. Technical Field

The present disclosure relates to an image display device that enables observation of a virtual image formed by a display element, etc. having a light emitting portion.

2. Related Art

A virtual image display device having a structure in which a metal frame member supporting an optical system and a display element are coupled using a heat dissipating sheet to perform heat dissipation (JP-A-2018-54979). Furthermore, JP-A-2018-54979 also describes, as an aspect, providing a noise reduction sheet that reduces noise generated in the display element (see FIG. 21 of JP-A-2018-54979).

In the device of JP-A-2018-54979, it is disclosed that the noise reducing sheet is disposed between the display element and the heat dissipation sheet so as to reduce spreading of noise generated by the display element through the heat dissipation sheet; in this case, heat transfer from the display element to the heat dissipation sheet is suppressed by the noise reducing sheet, and thus sufficient heat dissipation may not be possible depending on the configuration of the device.

SUMMARY

An image display device according to one aspect of the present disclosure includes a first display element that emits first imaging light, a first optical member that emits the first imaging light from the first display element, a first cover member that covers the first optical member and a first heat dissipation material that extends from the first cover member to the first display element and that conducts heat of the first display element to the first cover member.

DESCRIPTION OF EXEMPLARY EMBODIMENTS

First Exemplary Embodiment

Hereinafter, a structure, operation, etc. of an image display device according to the present disclosure will be described with reference to FIGS. 1 to 3, etc.

Figure 1:
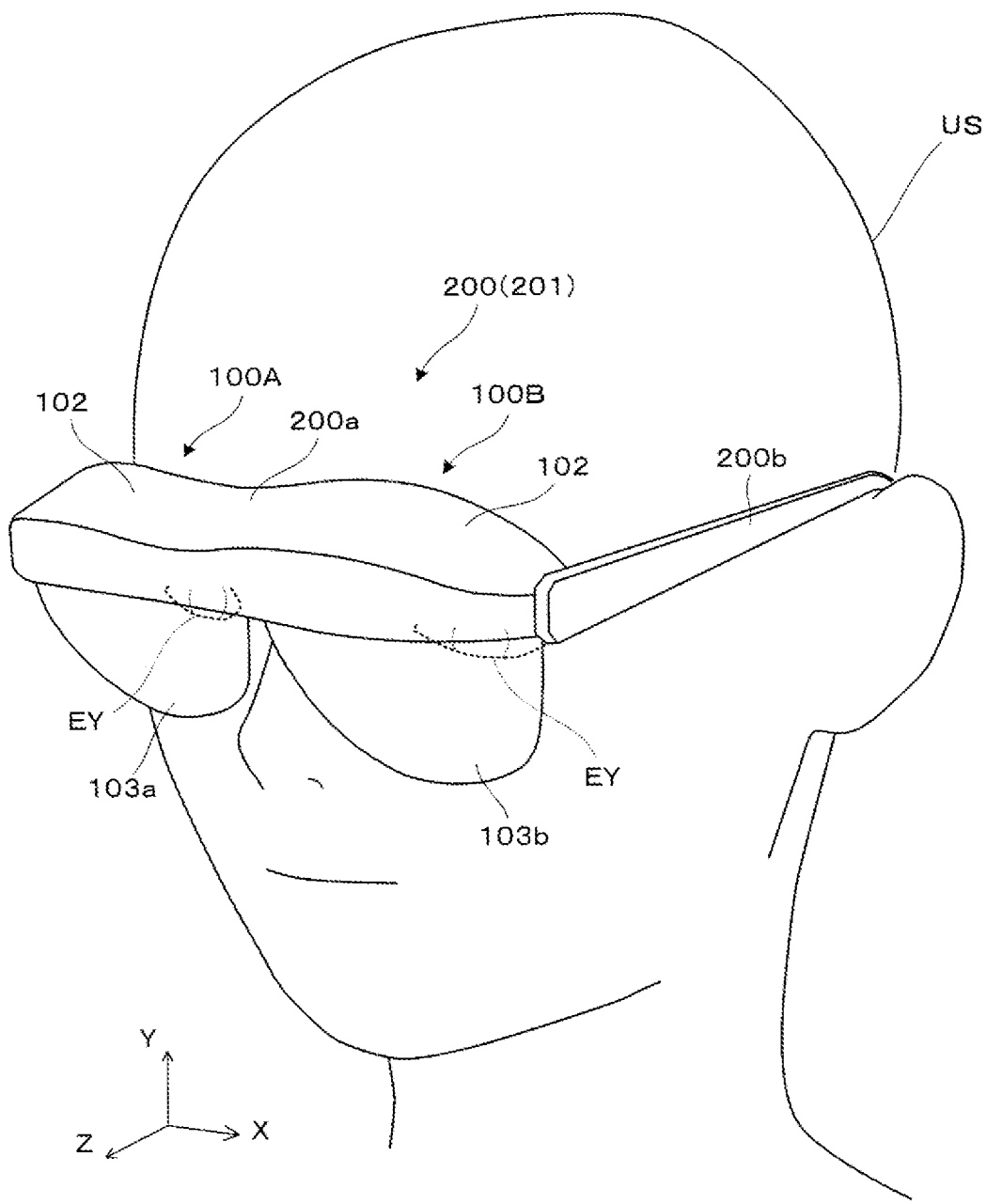
FIG. 1 is an external perspective view illustrating a wearing state of an image display device according to a first exemplary embodiment.
Figure 2:
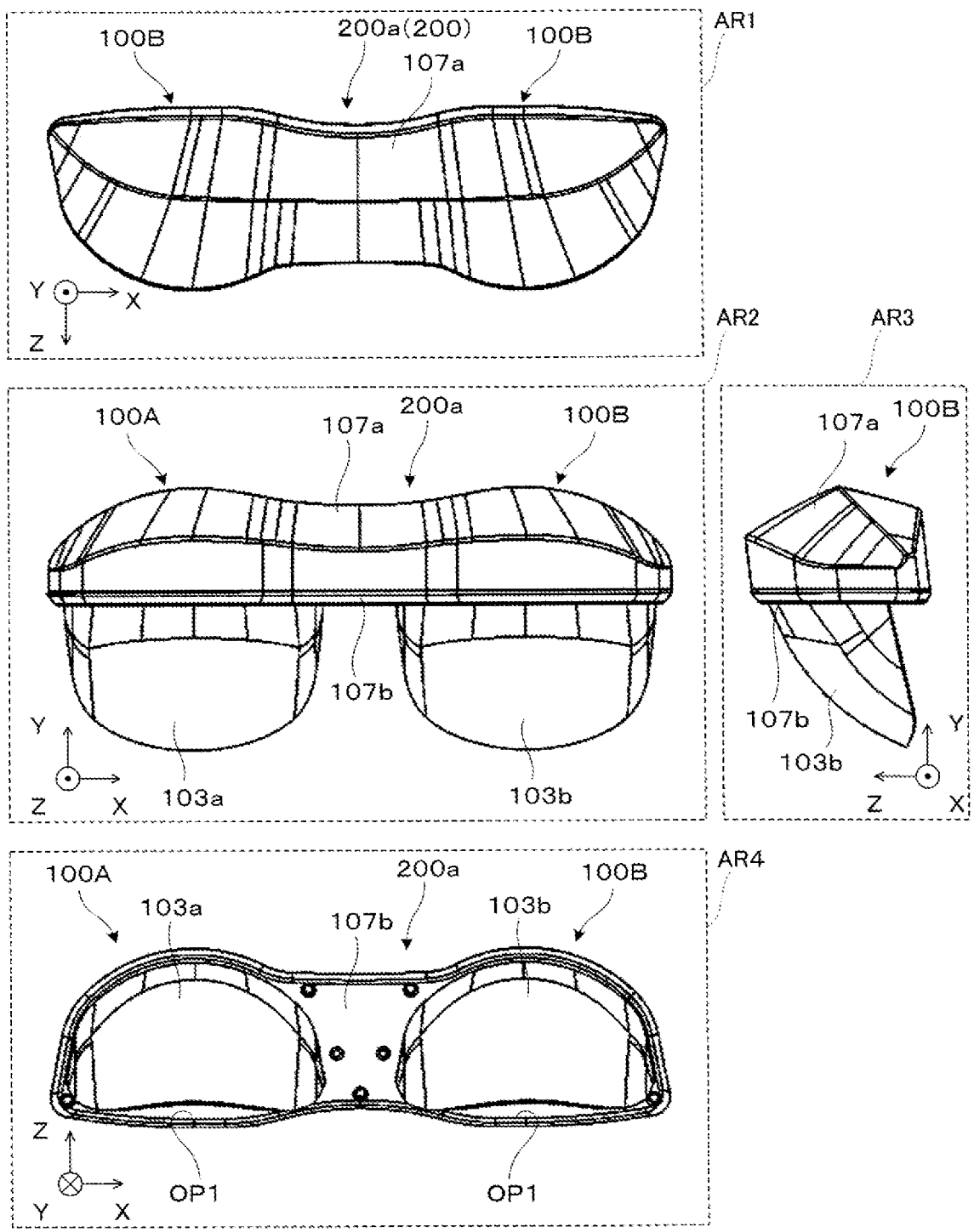
FIG. 2 is a plan view, front view, side view, and bottom view of the image display device.

FIG. 1 is a diagram illustrating a wearing state of an image display device 200. The image display device 200 is a head-mounted display (hereinafter, also referred to as HMD) 201, and causes an observer or a wearer US who wears the head-mounted display 201 to recognize an image as a virtual image. In FIG. 1, etc., X, Y, and Z correspond to an orthogonal coordinate system, a +X direction corresponds to a lateral direction in which the two eyes EY of the observer or wearer US who is wearing the image display device 200 or HMD 201 are arranged, a +Y direction corresponds to an upward direction orthogonal to the lateral direction in which the two eyes EY of the wearer US are arranged, and a +Z direction corresponds to a direction to the front or a forward direction for the wearer US. A ±Y direction is parallel to a vertical axis or a vertical direction.

The image display device 200 includes a main body 200a disposed to cover the front of the wearer US and a pair of temple support devices 200b that support the main body 200a. The main body 200a, when functionally viewed, includes a first display device 100A for the right eye and a second display device 100B for the left eye. The first display device 100A includes a display driving unit 102 disposed at an upper portion thereof, and a combiner 103a that is shaped like a spectacle lens and covers the front of the eye. Similarly, the second display device 100B includes a display driving unit 102 disposed at an upper portion thereof, and a combiner 103b that is shaped like a spectacle lens and covers the front of the eye.

The appearance of the main body 200a of the image display device 200 will be described with reference to FIG. 2. In FIG. 2, a region AR1 is a plan view of the main body 200a, a region AR2 is a front view of the main body 200a, a region AR3 is a side view of the main body 200a, and a region AR4 is a bottom view of the main body 200a. A pair of the display driving units 102 disposed on the +Y side or the upper side of the main body 200a are coupled and integrated, and are covered by a dome-shaped upper exterior member 107a elongated in the lateral direction and a flat plate-shaped lower exterior member 107b. The first combiner 103a and the second combiner 103b have a shape such that an upper portion of a hemisphere protruding in the forward or the +Z direction is cut, and is disposed so as to protrude downward from the lower exterior member 107b.

Figure 3:
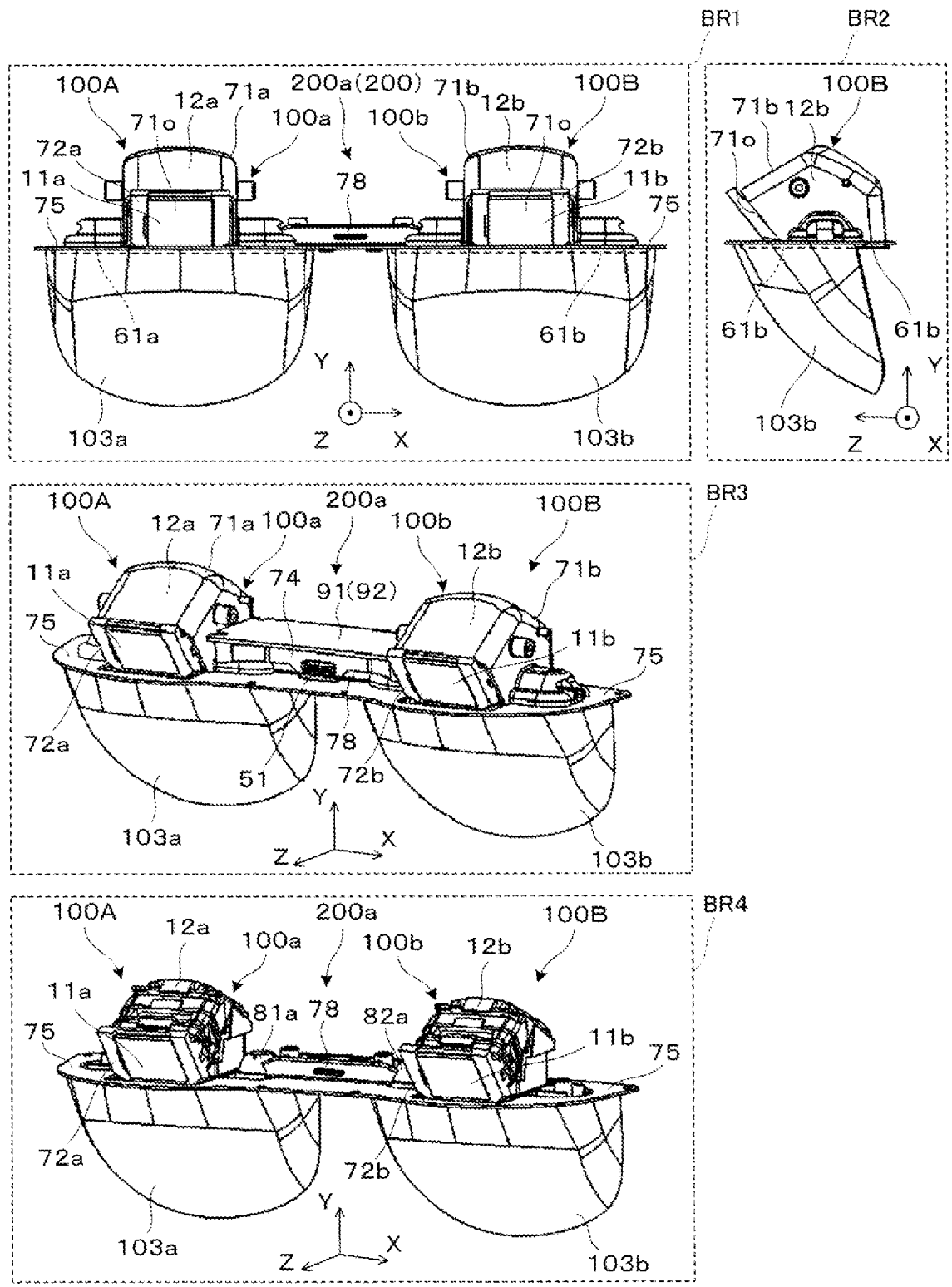
FIG. 3 is a front view, side view, perspective view, etc. illustrating an interior of the image display device with an exterior member removed.

With reference to FIG. 3, an overview of an internal structure in which the upper exterior member 107a and the lower exterior member 107b have been removed from the main body 200a illustrated in FIG. 2 will be described. In FIG. 3, a region BR1 is a front view with an upper portion of the main body 200a exposed, a region BR2 is a side view with the upper portion of the main body 200a exposed, a region BR3 is a perspective view with the upper portion of the main body 200a exposed, and a region BR4 is a perspective view with an internal optical system of the main body 200a exposed. The first display device 100A for the right eye includes a first display element 11a, a first optical system 12a, and the first combiner 103a, as the first display unit 100a. The first optical system 12a is covered with a resin-made first cover member 71a, which is an inner cover. The first display element 11a is disposed so as to close an opening 71o of the first cover member 71a, and is fixed to an outer frame of the first optical system 12a via a first holder 72a having a rectangular frame shape. Note that the first display element 11a is, for example, a spontaneous light emission type display device, and includes a light emitting portion to generate first imaging light as imaging light. The first optical system 12a emits the imaging light (first imaging light) from the first display element 11a. In other words, the first display unit 100a includes the first display element 11a, and performs image display by the first imaging light.

Figure 4:
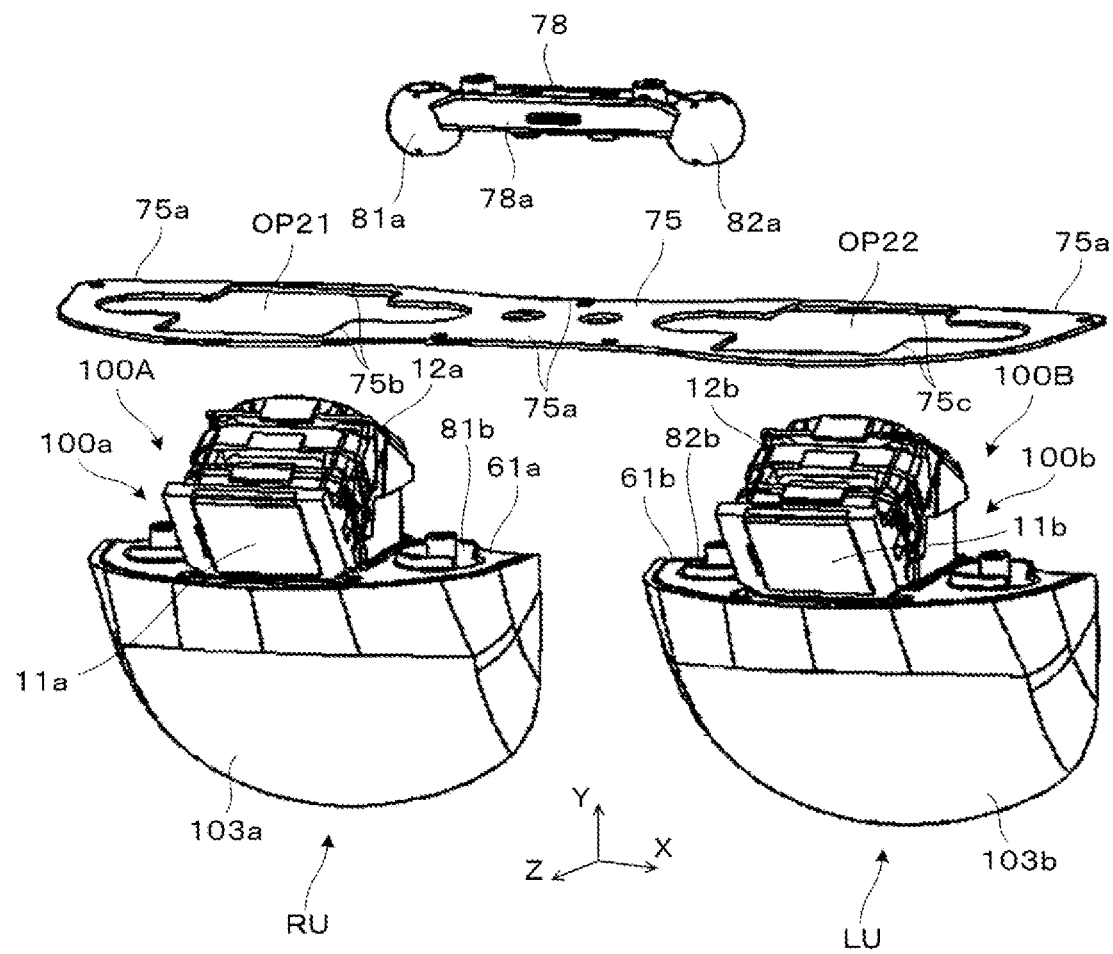
FIG. 4 is an exploded perspective view of the remainder of the portion where the exterior member is removed from the image display device.

As illustrated in FIG. 4, the first optical system 12a is fixed to an upper surface of the plate-shaped first frame 61a by adhesion, etc., and the first combiner 103a is fixed to the front half of the periphery of the first frame 61a by adhesion, etc. at an upper end thereof. In other words, the first optical system 12a and the first combiner 103a are supported by the first frame 61a. Note that the first frame 61a is a semi-circular plate-shaped metal member, and is formed, for example, from a magnesium alloy.

Referring back to FIG. 3, the second display device 100B includes a second display element 11b, a second optical system 12b, and the second combiner 103b, as the second display unit 100b. The second optical system 12b is covered with a resin-made second cover member 71b, which is an inner cover. The second display element 11b is disposed so as to close the opening 71o of the second cover member 71b, and is fixed to an outer frame of the second optical system 12b via the second holder 72b having a rectangular frame shape. The second display device 100B for the left eye has the same structure and function as the first display device 100A for the right eye. In other words, the second display element 11b is the same as the first display element 11a, the second optical system 12b is the same as the first optical system 12a, and the second combiner 103b is the same as the first combiner 103a. Thus, for example, the second display element 11b includes a light emitting portion to generate second imaging light as imaging light, and the second optical system 12b emits the second imaging light from the second display element 11b. The second display unit 100b includes the second display element 11b, and performs image display by the second imaging light. However, in a case where the first optical system 12a, the first combiner 103a, etc. have asymmetry with respect to the left and right X direction, the second optical system 12b, the second combiner 103b, etc. are obtained by laterally inverting the first optical system 12a, the first combiner 103a, etc.

As illustrated in FIG. 4, the second optical system 12b is fixed to an upper surface of the plate-shaped second frame 61b by adhesion, etc., and the second combiner 103b is fixed to the front half of the periphery of the second frame 61b by adhesion, etc. at an upper end thereof. In other words, the second optical system 12b and the second combiner 103b are supported by the second frame 61b. Note that the second frame 61b is a semi-circular plate-shaped metal member, and is formed, for example, from a magnesium alloy.

Referring back to FIG. 3, the first display device 100A and the second display device 100B are coupled via a fixing member 78 therein. The fixing member 78 is a rod-shaped metal member, and is formed from, for example, a magnesium alloy. By forming the fixing member 78 from the magnesium alloy, the first frame 61a and the second frame 61b can be cooled by heat dissipation. The fixing member 78 fixes the first display unit 100a and the second display unit 100b relative to each other at both ends thereof. The fixing member 78 is a member corresponding to an arm of a balance, and supports a pair of the display units 100a, 100b corresponding to a pair of plates in the center. The fixing member 78 has a shape that allows the first optical system 12a and the second optical system 12b to rotate in rotational directions around two or more axes when the first display unit 100a and the second display unit 100b are aligned prior to fixing.

Figure 5:
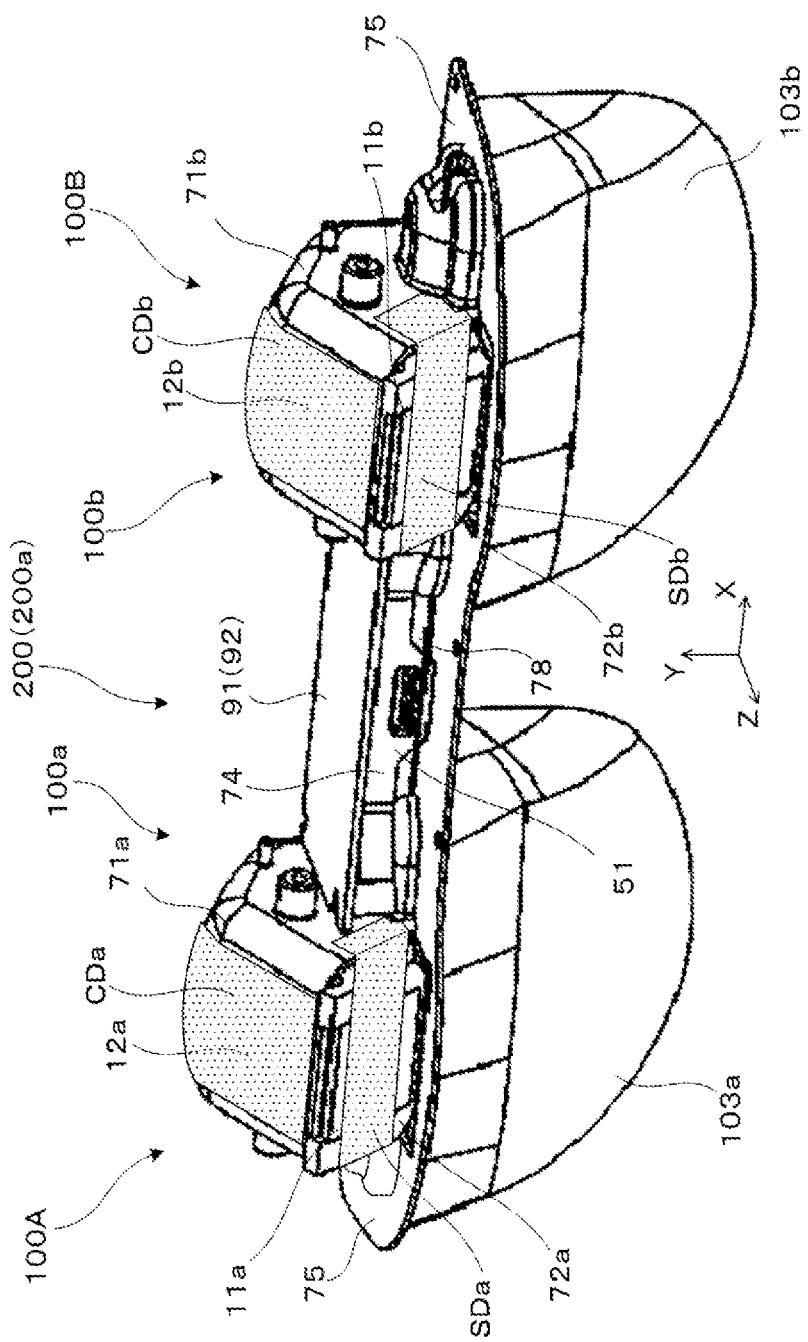
FIG. 5 is a perspective view illustrating the image display device in which a sheet type heat dissipation material is attached.

Here, as illustrated in the perspective view illustrated in FIG. 5, in the image display device 200 according to the present exemplary embodiment, a first sheet type heat dissipation material SDa and a second sheet type heat dissipation material SDb are attached to the first display element 11a and the second display element 11b. For example, the first sheet type heat dissipation material SDa is a heat conduction member that is attached from the resin-made first cover member 71a to the first display element 11a to conduct the heat of the first display element 11a to the first cover member 71a. Similarly, the second sheet type heat dissipation material SDb is a heat conduction member that conducts the heat of the second display element 11b to the resin-made second cover member 71b.

Each of the sheet type heat dissipation materials SDa, SDb is a thermally conductive tape constituted by a graphite sheet having an adhesive surface, and is directly attached to the first display element 11a, etc. to perform heat conduction. In other words, in the above-described aspect, sufficient heat dissipation is ensured by conducting the heat generated by the display elements 11a, 11b to the cover members 71a, 71b by the sheet type heat dissipation materials SDa, SDb.

Here, in the first display element 11a and the second display element 11b, the generated noise is a problem. Specifically, electromagnetic waves are generated by weak electrical power, etc. in the circuit board of the organic EL panel constituting the first display element 11a, etc., and this may be noise and transmitted to the other member, which may cause an influence, etc. In order to avoid or suppress such a situation, in the above-described example, as the cover members 71a, 71b, which are heat dissipation destinations, cover members made of resin having low conductivity are adopted. In other words, in the case described above, by interposing a material having low conductivity during heat conduction by the sheet type heat dissipation materials SDa, SDb, the conduction of noise generated in the first display element 11a and the second display element 11b is avoided or suppressed.

Further, the first sheet type heat dissipation material SDa and the second sheet type heat dissipation material SDb are separated from the first frame 61a and the second frame 61b, which are metal frames that support the first optical system 12a and the second optical system 12b. This prevents noise generated by the first display element 11a, etc. from being conducted to the first frame 61a, etc. via the first sheet type heat dissipation material SDa, etc.

Additionally, the first sheet type heat dissipation material SDa and the second sheet type heat dissipation material SDb are provided so as not to overlap with each other. In other words, the graphite sheets do not overlap with each other. This suppresses transmission of one noise to the other.

Furthermore, in the illustrated example, a first cover member heat dissipation material CDa and a second cover member heat dissipation material CDb are attached to the first cover member 71a and the second cover member 71b. Each of the cover member heat dissipation materials CDa, CDb is a thermally conductive tape constituted by a graphite sheet having an adhesive surface, and is a heat conduction member that conducts heat conduction by being directly attached to the first cover member 71a, etc. In one example illustrated in the drawings, the cover member heat dissipation materials CDa, CDb are attached to outer surfaces of the cover members 71a, 71b, and are provided along the first optical system 12a and the second optical system 12b accommodated within the cover members 71a, 71b. The heat dissipation due to heat conduction with the cover member heat dissipation materials CDa, CDb can reduce the increase in temperature inside the cover members 71a, 71b. In other words, degradation of image distortion, etc. caused by changes in the temperature of the first optical system 12a and the second optical system 12b can be avoided or suppressed.

Also here, the graphite sheets do not overlap with each other. That is, the first cover member heat dissipation material CDa and the second cover member heat dissipation material CDb are provided so as not to overlap with each other, and these are provided so as not to overlap with the first sheet type heat dissipation material SDa and the second sheet type heat dissipation material SDb.

Figure 6:
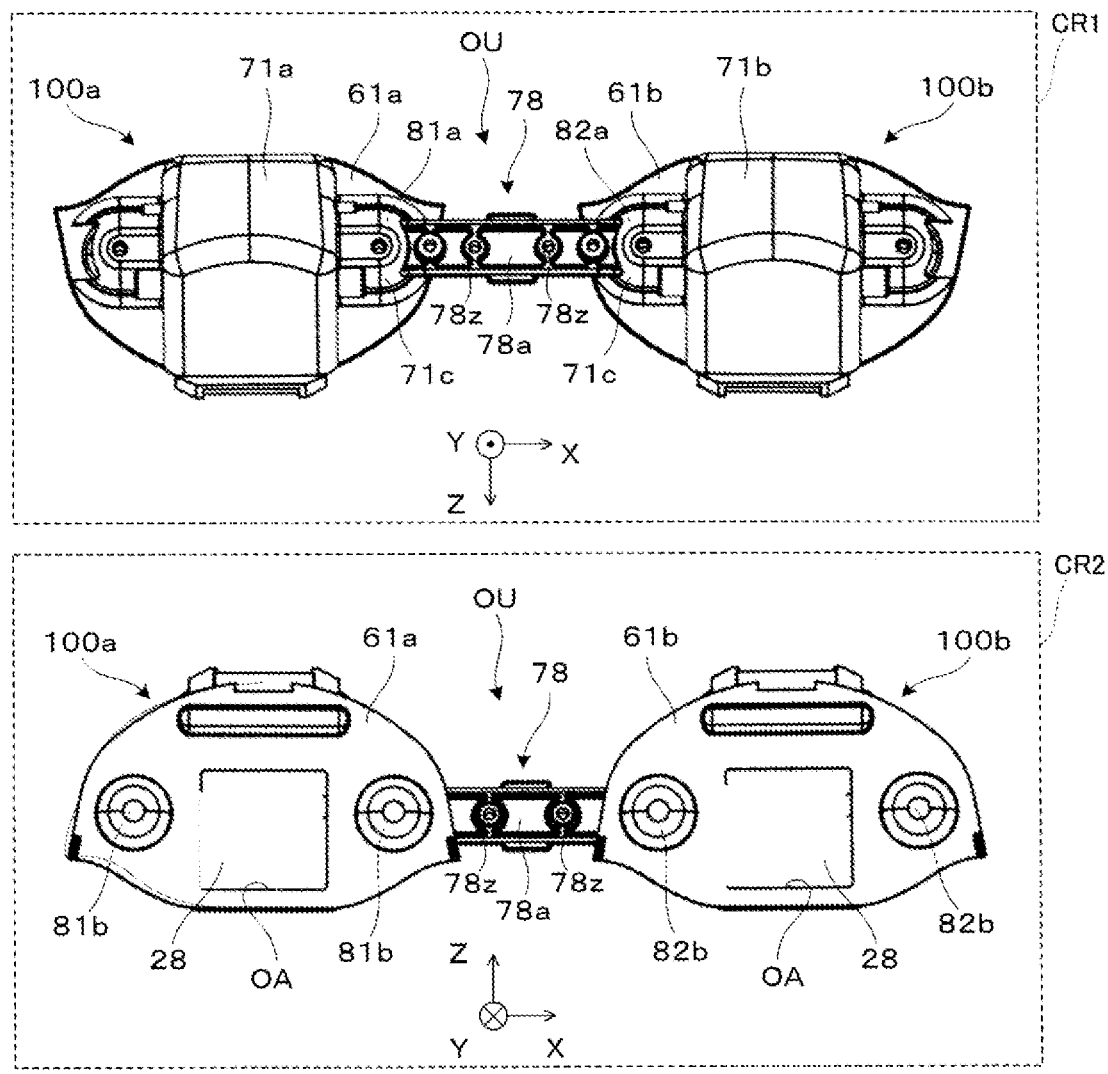
FIG. 6 is a plan view and a bottom view of an optical unit at which left and right display units are combined.
Figure 7:
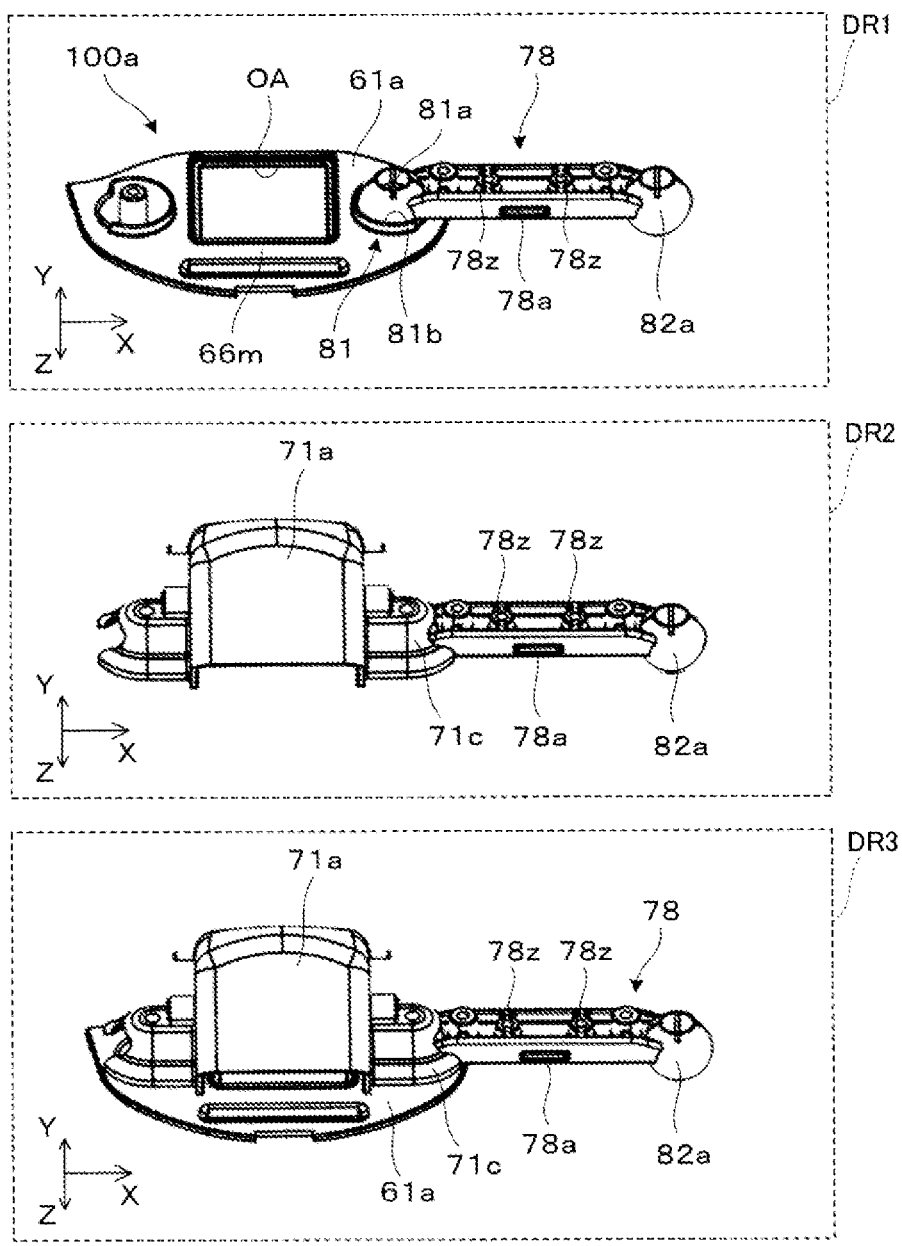
FIG. 7 is a perspective view describing a coupling between a first frame and a fixing member, a perspective view describing a positional relationship between the fixing member and a first cover member, and a perspective view describing a positional relationship between the first frame, the fixing member, and the first cover member.

The support of the first display unit 100a and the second display unit 100b by the fixing member 78 will be described with reference to FIGS. 4, 6 and 7. In FIG. 6, a region CR1 is a plan view of an optical unit OU coupled to the left and right display units 100a, 100b, and a region CR2 is a bottom view of the optical unit OU. In FIG. 7, a region DR1 is a perspective view describing a coupling between the first display unit 100a and the fixing member 78, a region DR2 is a perspective view describing a positional relationship between the fixing member 78 and the first cover member 71a, and a region DR3 is a perspective view describing a positional relationship between the first display unit 100a, the fixing member 78, and the first cover member 71a. Fixing portions 81a, 82a, which are spherical members similar to those of the ball joint components, are formed at both ends of the fixing member 78. After the first display unit 100a and the second display unit 100b are aligned, these fixing portions 81a, 82a are adhered to concave portions 81b, 82b, which are hemispherical indentation members provided at the inner ends of the display units 100a, 100b or the frame 61a, 61b by an adhesive material, etc., whereby the rotation is stopped. A coupling member 81 that combines the fixing portion 81a and the concave portion 81b is covered by an extending portion 71c of the first cover member 71a. A coupling member 82 that combines the fixing portion 82a and the concave portion 82b is also covered by an extending portion 71c of the second cover member 71b.

As described above, the first frame 61a is a semi-circular plate-shaped metal member, and is formed, for example, from a magnesium alloy. By forming the first frame 61a from the magnesium alloy, heat dissipation efficiency of heat generated by the display element 11a, etc. can be increased. The concave portions 81b are formed at both the left and right ends of the first frame 61a, but only one of the concave portions 81b is used for coupling with the fixing member 78. An optical aperture OA is formed at the first frame 61a, and a plate-shaped optical element 28 that seals the optical aperture OA is disposed. The plate-shaped optical element 28 is part of the first optical system 12a. As described above, the second frame 61b is a semi-circular metal member, and is formed, for example, from a magnesium alloy. By forming the second frame 61b from the magnesium alloy, heat dissipation efficiency of heat generated by the display element 11b, etc. can be increased. The concave portions 82b are formed at both the left and right ends of the second frame 61b, but only one of the concave portions 82b is used for coupling with the fixing member 78. An optical aperture OA is also formed at the second frame 61b, and a plate-shaped optical element 28 that seals the optical aperture OA is disposed.

Figure 8:
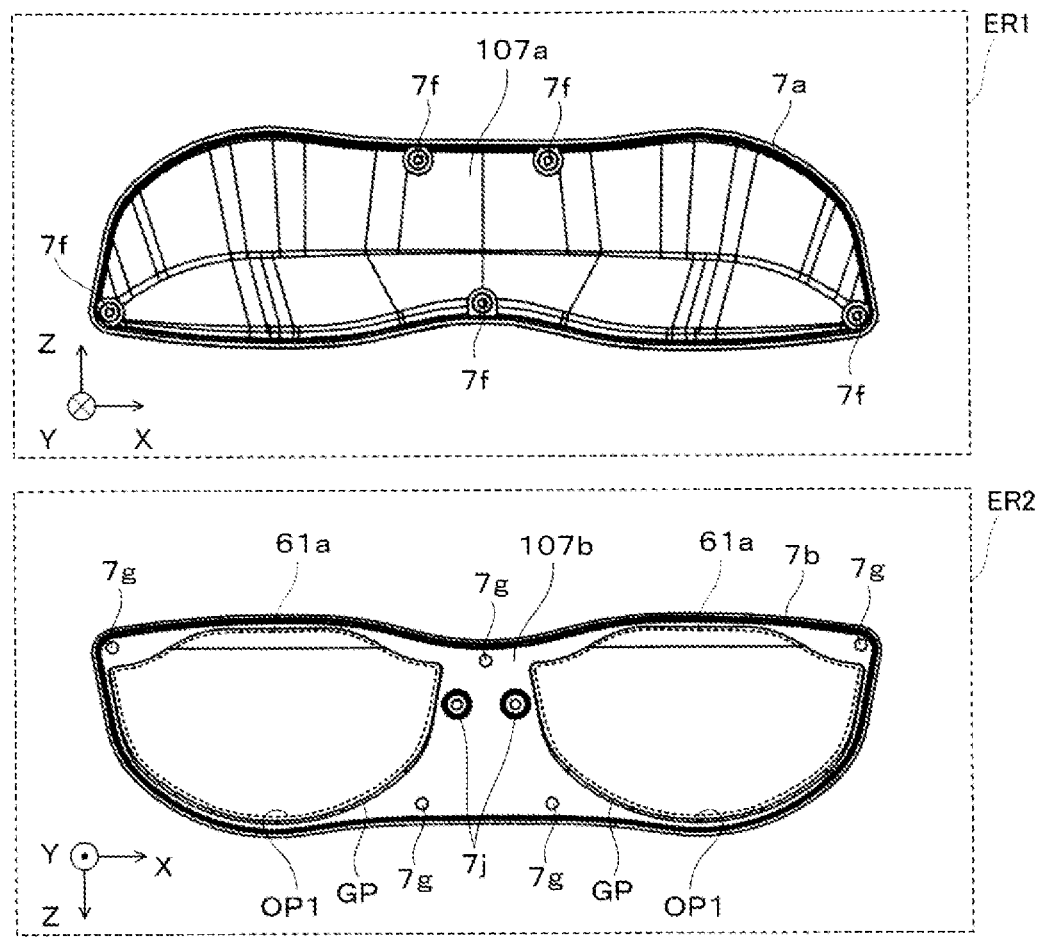
FIG. 8 illustrates a bottom view of an upper exterior member and a plan view of a lower exterior member.

The upper exterior member 107a and the lower exterior member 107b will be described with reference to FIG. 8. In FIG. 8, a region ER1 is a bottom view illustrating the inside of the upper exterior member 107a, and a region ER2 is a plan view illustrating the inside of the lower exterior member 107b. The upper exterior member 107a and the lower exterior member 107b are formed from a resin material. An outer edge 7a of the upper exterior member 107a and an outer edge 7b of the lower exterior member 107b have the same shape. By abutting them, a space for accommodating the first optical system 12a and the second optical system 12b illustrated in FIG. 3 can be formed. The upper exterior member 107a and the lower exterior member 107b are fixed using fastening portions 7f, 7g, which are screw holes, etc. The lower exterior member 107b has a pair of openings OP1, and the first frame 61a and the second frame 61b can be disposed at the openings OP1, as indicated by a dotted lines. Gaps GP are provided between the openings OP1 and the frames 61a, 61b, and allows the frames 61a, 61b to shift in position with respect to the X-Y plane or the Y direction within the openings OP1. That is, the first display unit 100a and the second display unit 100b illustrated in FIG. 3, etc. are fixed to the lower exterior member 107b while remaining aligned with each other, and even in a state of being accommodated in the upper exterior member 107a and the lower exterior member 107b, the positional relationship between the display units 100a, 100b upon completion of positioning is maintained. Screwing hole 7j are formed at the lower exterior member 107b and can be fixed by screwing to a pair of fastening portions 78z (See FIGS. 6 and 7) provided at a bridge 78a of the fixing member 78.

Referring to FIGS. 3 and 4, an elastic sheet 75 is disposed above the first frame 61a and the second frame 61b. An outer circumferential portion 75a of the elastic sheet 75 is sandwiched between the outer edge 7a of the upper exterior member 107a illustrated in FIG. 8 and the outer edge 7b of the lower exterior member 107b to allow hermetic or liquid-tight sealing between the outer exterior members 107a, 107b. A pair of openings OP21 and OP22 are formed at the elastic sheet 75. An inner circumferential portion 75b around one opening OP21 is sandwiched between the upper surface of the first frame 61a and the lower end of the first cover member 71a, to allow hermetic or liquid-tight sealing between the first frame 61a and the first cover member 71a. An inner circumferential portion 75c around the other opening OP22 is sandwiched between the upper surface of the second frame 61b and the lower end of the second cover member 71b, to allow hermetic or liquid-tight sealing between the second frame 61b and the second cover member 71b.

With reference to FIG. 3, a rectangular plate-shaped circuit board 91 is disposed above the fixing member 78 between the left and right display units 100a, 100b. The circuit board 91 includes a control device 92 that controls display operation of the first display element 11a and the second display element 11b. The control device 92 outputs a drive signal corresponding to the display image to the left and right display elements 11a, 11b to control the display operation of the left and right display elements 11a, 11b. The control device 92 includes, for example, an IF circuit, a signal processing circuit, etc., and causes the left and right display elements 11a, 11b to display a two-dimensional image according to the image data or the image signal received from the outside. Although not shown, the control device 92 includes a main board that controls the operation of the first display device 100A and the operation of the second display device 100B. The main substrate may have, for example, an interface function that communicates with an external device (not shown) and performs signal conversion on a signal received from the external device, and an integrated function that links between the display operation of the first display device 100A and the display operation of the second display device 100B.

The circuit board 91 is supported on the fixing member 78 by a substrate support portion 74. The circuit board 91 is fixed at the substrate support portion 74. The substrate support portion 74 is a member made of resin covering the fixing member 78 from the upper, front, and rear, and is detachable from the fixing member 78 together with the circuit board 91 by a snap fit using a fitting portion 51.

Figure 9:
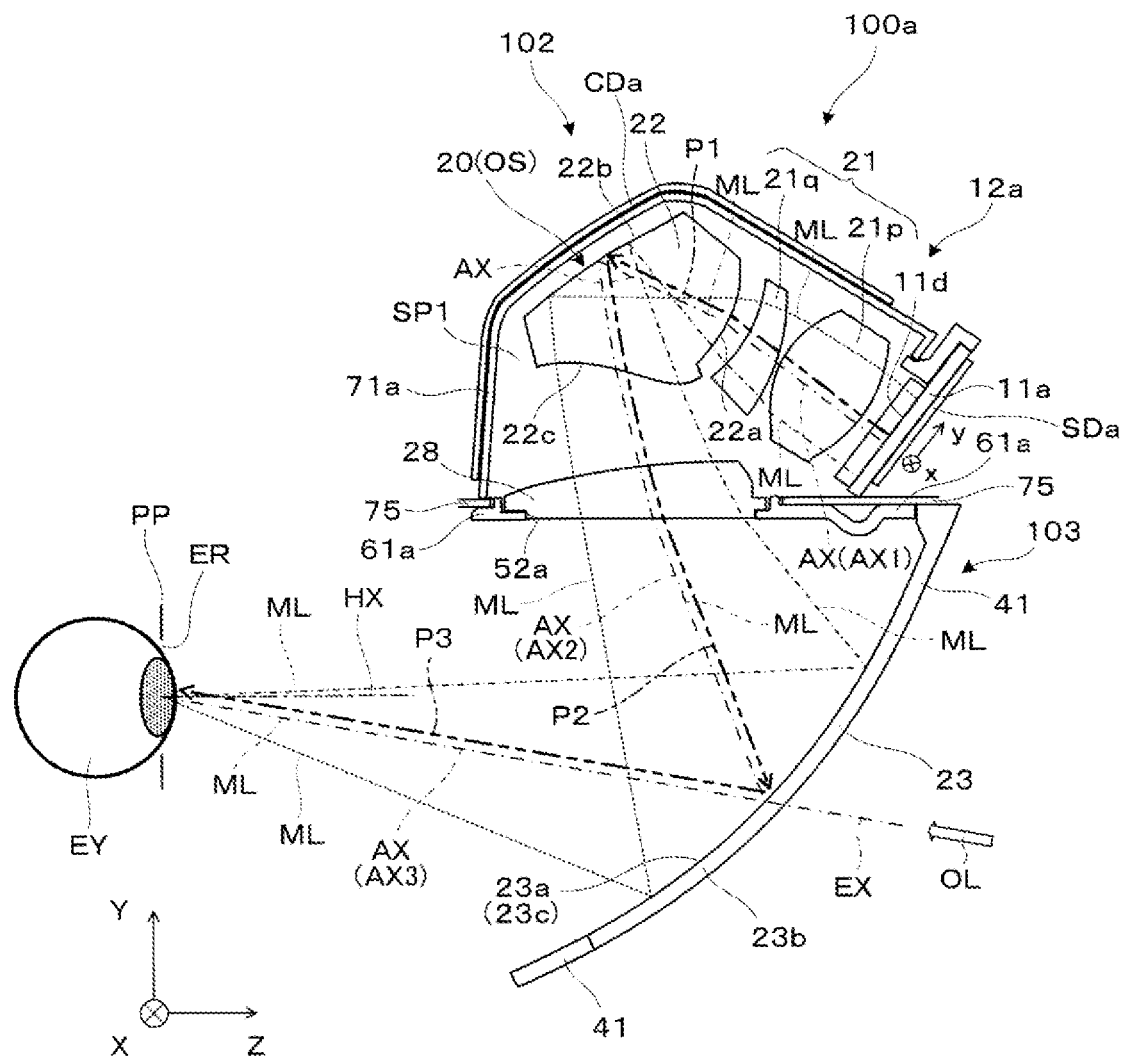
FIG. 9 is a conceptual side cross-sectional view illustrating an optical system inside the image display device.

FIG. 9 is a side cross-sectional view illustrating an optical structure of the first display unit 100a. The first display unit 100a includes the first display element 11a and an imaging optical system 20. The imaging optical system 20 is also referred to as a light guide optical device. The imaging optical system 20 includes a projection lens 21, a prism mirror 22, the plate-shaped optical element 28, and a see-through mirror 23. The projection lens 21, the prism mirror 22, and the plate-shaped optical element 28 of the imaging optical system 20 correspond to the first optical system 12a illustrated in FIG. 3, etc., and the see-through mirror 23 corresponds to the first combiner 103a. The first display element 11a, the projection lens 21, and the prism mirror 22 are fixed to the first frame 61a in a state of being aligned with each other by a frame body (not illustrated), and is accommodated in a space SP1 sandwiched between the first cover member 71a and the first frame 61a. The plate-shaped optical element 28 is disposed so as to be fitted into a step formed at the optical aperture OA of the first frame 61a, and the periphery of the optical aperture OA is kept airtight state.

As described above, the first display element 11a is a spontaneous light emission type display device having a light emitting portion. The first display element 11a is, for example, an organic EL (Organic Electro-luminescence) display, and forms a color still image or moving image on a two-dimensional display surface 11d. The first display element 11a is disposed along an x-y plane that is inclined by being slightly rotated about the X axis with respect to an X-Y plane. The first display element 11a is driven by the control device 92 provided at the circuit board 91 to perform display operation. The first display element 11a is not limited to the organic EL display, and can be replaced with a micro LED display or a display device using an inorganic EL, an organic LED, a laser array, a quantum dot light emitting element, etc. The first display element 11a is not limited to a spontaneous light emission type imaging light generation device, and may include an LCD and another light modulation element, and may form an image by illuminating the light modulation element with a light source (light emitting portion) such as a backlight. As the first display element 11a, a LCOS (Liquid crystal on silicon, LCoS is a registered trademark), a digital micro-mirror device, etc. may be used instead of an LCD.

The projection lens 21 causes the imaging light (first imaging light) ML emitted from the first display element 11a to pass therethrough and then to be incident on the prism mirror 22. The projection lens 21 focuses the imaging light ML emitted from the first display element 11a into a state close to a parallel luminous flux. The projection lens 21 includes a first lens 21p and a second lens 21q. The prism mirror 22 has an inner reflection surface 22b, and causes the imaging light ML emitted from the projection lens 21 to be incident on a light incident surface 22a, to be totally reflected by the inner reflection surface 22b, and to be emitted from a light emission surface 22c. At this time, the prism mirror 22 emits the imaging light ML incident from the front such that it is bent in a direction inclined with respect to a direction in which an incident direction is reversed (a direction of the light source seen from the prism mirror 22). The plate-shaped optical element 28 causes the imaging light ML from the prism mirror 22 to pass therethrough while being refracted, and the see-through mirror 23 reflects the image light ML emitted from the prism mirror 22 toward a pupil position PP. The pupil position PP is a position at which the imaging light ML from each of points on the display surface 11d is incident so as to be overlapped from an angular direction corresponding to a position of each of points on the display surface 11d in a predetermined divergent state or a parallel state.

The see-through mirror 23 is a curved plate-shaped optical member that serves as a concave surface mirror, and reflects the imaging light ML incident from the prism mirror 22 via the plate-shaped optical element 28 toward a pupil position PP. The see-through mirror 23 covers the pupil position PP at which the eye EY or the pupil is disposed, has a concave shape toward the pupil position PP, and has a convex shape toward the outside. The see-through mirror 23 is a mirror plate having a structure in which a mirror film 23c is formed at a front surface or a back surface of a plate-shaped body 23b. The reflection surface 23a of the see-through mirror 23 has transmissive properties. The external light OL that has passed through the see-through mirror 23 and a support plate 41 therearound is also incident on the pupil position PP. In other words, the wearer US wearing the image display device 200 can observe a virtual image of the imaging light ML in a state in which the imaging light ML overlaps with the external image.

In the above, optical surfaces constituting the projection lens 21, the prism mirror 22, the plate-shaped optical element 28, and the see-through mirror 23 includes a free-form surface, and at least some of the optical surfaces may be replaced with an aspheric surface or a spherical surface.

The imaging optical system 20 is an off-axis optical system OS due to the see-through mirror 23 being a concave mirror, etc. In the case of the present exemplary embodiment, the projection lens 21, the prism mirror 22, the plate-shaped optical element 28, and the see-through mirror 23 are disposed non-axisymmetric and have a non-axisymmetric optical surface. In the imaging optical system 20, that is, the off-axis optical system OS, an optical axis AX is bent so that the optical axis AX extends along an off-axis surface (a surface parallel to the Y-Z surface) corresponding to a plane of the drawing. In the imaging optical system 20, the optical elements 21, 22, and 23 are arranged along the off-axis surface by bending the optical axis AX in the off-axis plane parallel to the Y-Z plane. The imaging optical system 20 includes optical axis portions AX1, AX2, and AX3 that are disposed along the off-axis surface (a surface parallel to the Y-Z plane) which is a reference surface extending in the longitudinal direction and are inclined with respect to each other before and after the reflection surface. The optical axis AX as a whole extends along an optical path of the main rays emitted from the center of the display element 11a and passes through the center of the eye ring ER or the pupil corresponding to an eye point. The optical axis AX is disposed in a Z shape by the plurality of optical axis portions AX1, AX2, and AX3 when seen in a transverse cross section parallel to the Y-Z plane. In other words, in the off-axis surface parallel to the Y-Z plane, an optical path P1 from the projection lens 21 to an inner reflection surface 22b, an optical path P2 from the inner reflection surface 22b to the see-through mirror 23, and an optical path P3 from the see-through mirror 23 to the pupil position PP are arranged to be bent in a Z shape in two stages.

Figure 10:
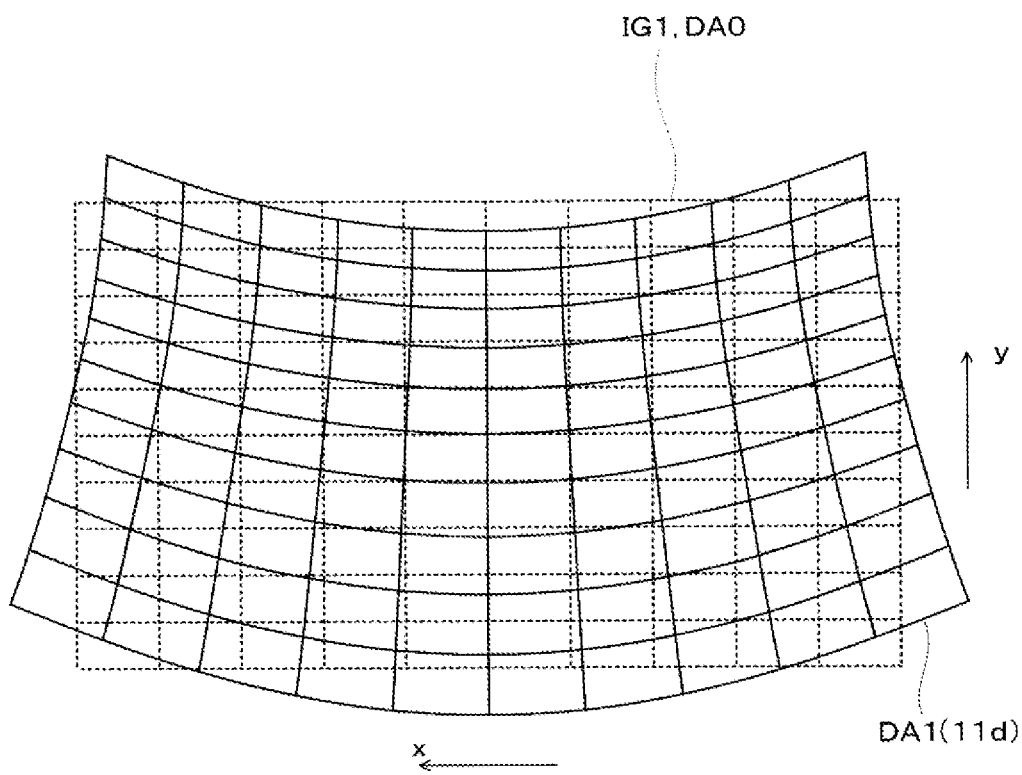
FIG. 10 is a diagram illustrating distortion correction of a display image.

As illustrated in FIG. 10, the display image formed at the display surface 11d of the first display element 11a is set to a modified image DA1 having a distortion such as trapezoidal distortion. That is, since the imaging optical system 20 is the off-axis optical system OS, it is not easy for the optical system itself to remove distortion such as trapezoidal distortion. In this way, a pixel array of a projected image IG1 of the virtual image observed at the pupil position PP via the imaging optical system 20 can be made into a grid pattern corresponding to an original display image DA0, and the outline thereof can be made rectangular by causing the image displayed on the first display element 11a to have reverse distortion that cancels out the distortion formed by the projection lens 21, the prism mirror 22, the plate-shaped optical element 28, and the see-through mirror 23. In other words, the first display element 11a corrects the distortion formed by the projection lens 21, the prism mirror 22, the plate-shaped optical element 28, and the see-through mirror 23. As a result, aberrations can be suppressed as a whole including the first display element 11a while allowing the distortion generated by the see-through mirror 23, etc. Thus, the degree of freedom in the arrangement and size of optical elements such as the prism mirror 22 is increased, and it is possible to easily secure the optical performance of the first display unit 100a while achieving miniaturization of the first display unit 100a.

Although the first display unit 100a has been described above, the second display unit 100b has a similar structure to that of the first display unit 100a, and similarly guides the image light (second image light) to form a virtual image. Therefore, a description of the specific structure thereof will be omitted.

As described above, the image display device 200 according to the present exemplary embodiment includes the display elements 11a, 11b including the light emitting portion of the imaging light ML, the optical systems 12a, 12b configured to emit the imaging light ML from the display elements 11a, 11b, the resin-made cover members 71a, 71b configured to cover the optical systems 12a, 12b, the sheet type heat dissipation materials SDa, SDb attached from the cover members 71a, 71b to the display elements 11a, 11b, and configured to conduct the heat of the display elements 11a, 11b to the cover members 71a, 71b. In this case, in the image display device 200, sufficient heat dissipation is ensured by conducting the heat generated by the display elements 11a, 11b to the cover members 71a, 71b by the sheet type heat dissipation materials SDa, SDb. In addition, by adopting the resin-made cover members 71a, 71b as heat dissipation destinations, the conduction of noise generated by the display elements 11a, 11b is suppressed. In other words, in the image display device 200, the conduction of noise generated by the display elements 11a, 11b is suppressed by interposing a material having low conductivity during heat conduction.

Second Exemplary Embodiment

Hereinafter, an image display device according to a second exemplary embodiment will be described with reference to FIG. 11, etc. Note that the image display device according to the present exemplary embodiment is a partial modification of the image display device of the first exemplary embodiment, and is the same for other configurations except for the structure related to heat dissipation. Therefore, for those having the same reference numerals as other drawings for the overall configuration, detailed illustrations and explanations shall be omitted, and the matters explained with reference to other drawings shall be incorporated as necessary.

Figure 11:
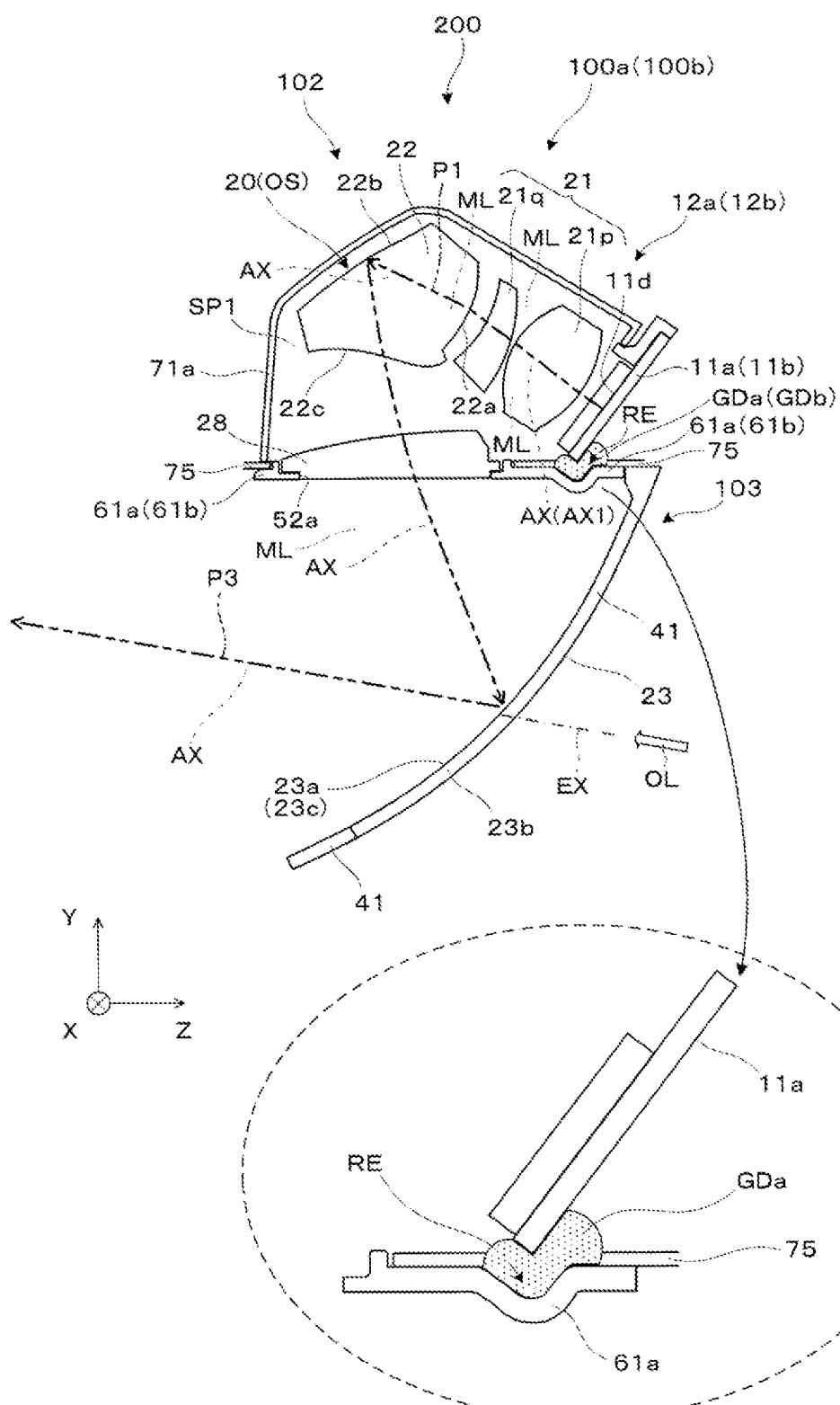
FIG. 11 is a conceptual side cross-sectional view illustrating an image display device of an second exemplary embodiment.

FIG. 11 is a conceptual side cross-sectional view illustrating the image display device 200 of the present exemplary embodiment, corresponding to FIG. 9. Here, of the left-right symmetric first display unit 100a and the second display unit 100b constituting the image display device 200, the first display unit 100a will be described as representative.

In the present exemplary embodiment, a concave portion RE is provided in the vicinity of the first display element 11a of the first frame 61a, which is a metal frame that supports the first optical system 12a. As illustrated, the concave portion RE is a concave portion formed at the first frame 61a having a flat plate shape, into which a portion of the first display element 11a is inserted. In other words, the concave portion RE forms a space that functions as an adjustment margin for assembling and adjusting the first display element 11a, for example.

In the present exemplary embodiment, after the assembly adjustment of the first display element 11a is performed, the concave portion RE of the first frame 61a is filled with a grease, and thus a grease-like heat dissipation material GDa is provided. The grease-like heat dissipation material GDa is formed from the first display element 11a to the first frame 61a, and conduct the heat generated by the first display element 11a to the first frame 61a. In other words, the image display device 200 includes the grease-like heat dissipation material GDa as a heat conduction member filled into the concave portion RE of the first frame 61a and conducting heat of the first display element 11a to the first frame 61a.

As described above, the first frame 61a functions as a heat dissipating body that dissipates the heat of the first display element 11a. In other words, in addition to being formed of a magnesium alloy and being in close proximity to the first display element 11a, in the above-described exemplary embodiment, the grease-like heat dissipation material GDa is filled and coupled therebetween, thereby the first frame 61a has further improved heat dissipation efficiency of the heat generated by the display element 11a, etc.

Here, the grease-like heat dissipation material GDa is constituted by substances (insulators) having low electrical conductivity, and in the heat conduction, the conduction of noise generated by the first display element 11a to the first frame 61a is suppressed.

Figure 12:
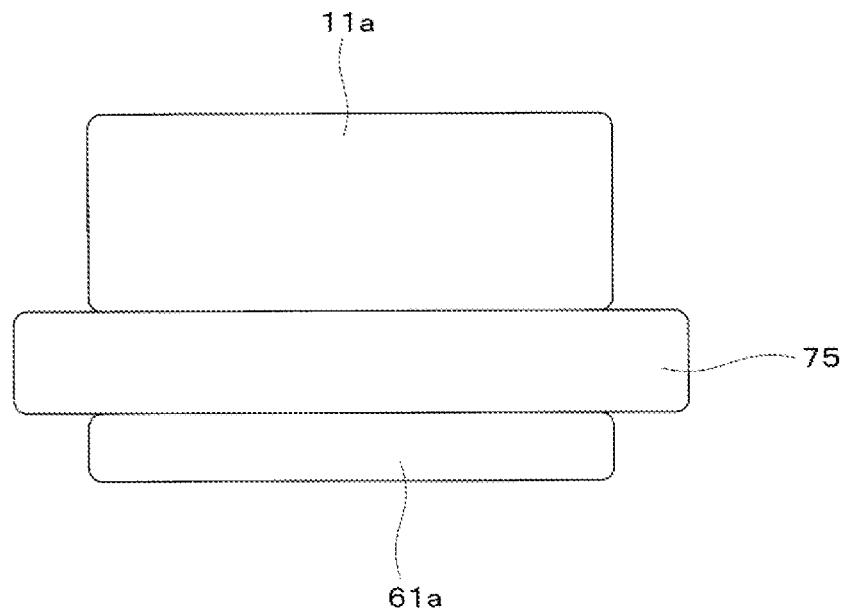
FIG. 12 is a conceptual drawing for explaining a structure of heat insulation in the image display device.

Furthermore, in the case of the above-described configuration, as conceptually illustrated in FIG. 12, the elastic sheet 75 functions as a heat insulating member provided between the first frame 61a as a heat dissipation material and the first optical system 12a. In other words, in the case of the above-described configuration, the elastic sheet 75 is in a state of being interposed between the first frame 61a and the first optical system 12a, so that the elastic sheet 75 can block or suppress the heat transferred to the first frame 61a via the grease-like heat dissipation material GDa from flowing toward the first optical system 12a, the electronic circuit for image formation (not illustrated), etc. It is also conceivable to deform the shape of the elastic sheet 75 in various ways so as to further demonstrate the effects described above.

Although the first display unit 100a has been described above, the second display unit 100b has a similar structure to that of the first display unit 100a, and thus a description of the specific structure thereof will be omitted. In other words, similar grease-like heat dissipation material GDb can also be provided at the second display unit 100b.

Figure 13:
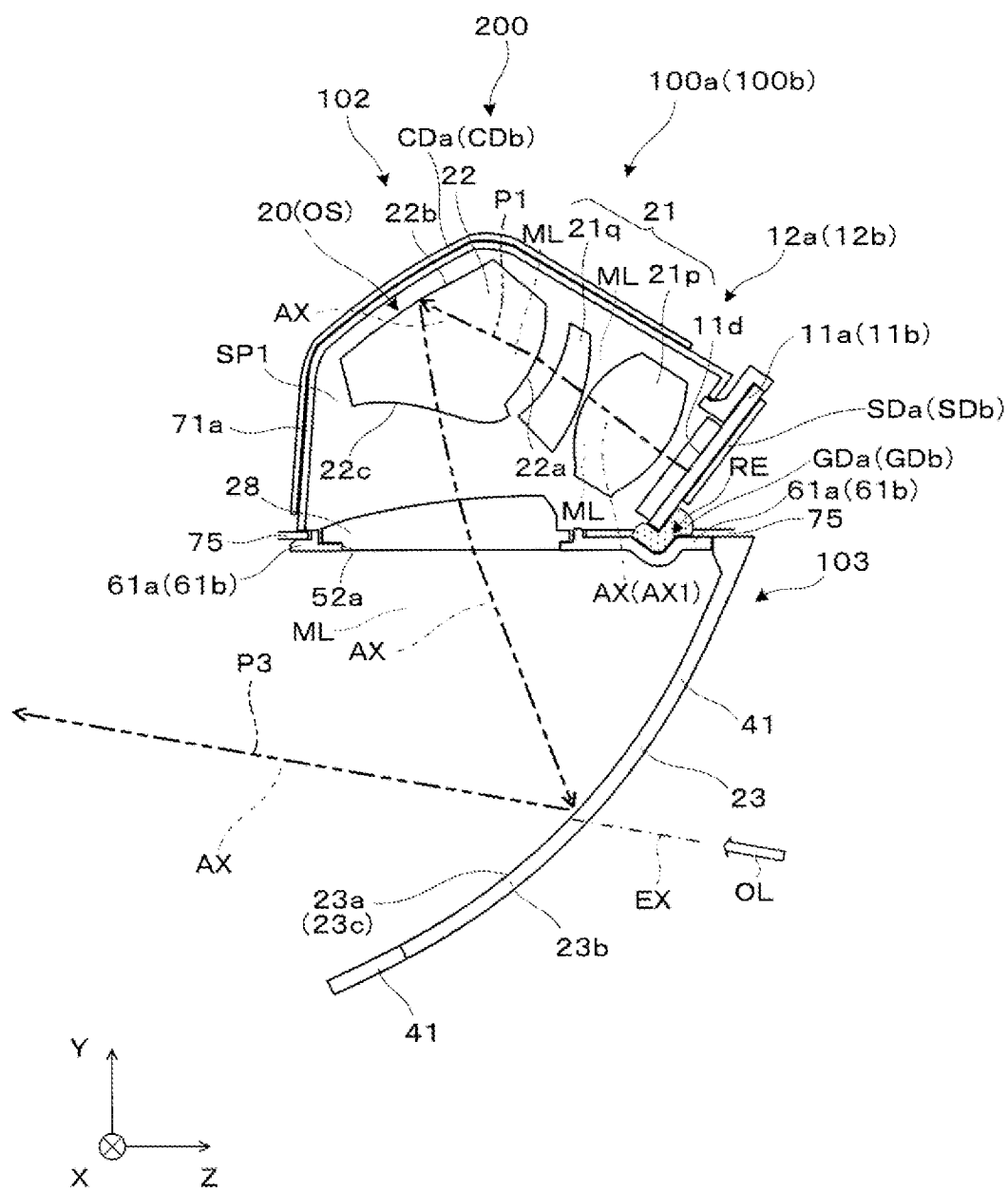
FIG. 13 is a conceptual side cross-sectional view illustrating an image display device of one modified example.

Note that, in the exemplary embodiment described above, instead of the sheet type heat dissipation material SDa, etc. of the first exemplary embodiment described with reference to FIG. 5, the present disclosure is configured to employ the grease-like heat dissipation material GDa, etc.; as illustrated in FIG. 13 corresponding to FIG. 11, in addition to the grease-like heat dissipation material GDa, a configuration is possible in which the cover member heat dissipation material SDa and the cover member heat dissipation material CDa are provided.

As described above, the image display device 200 according to the present exemplary embodiment includes the display elements 11a, 11b including the light emitting portion of the imaging light ML, the optical systems 12a, 12b configured to emit the imaging light ML from the display elements 11a, 11b, the metal frames 61a, 61b including the concave portion RE into which portions of the display elements 11a, 11b are inserted, the metal frames 61a, 61b being configured to support the optical systems 12a, 12b, and the grease-like heat dissipation materials GDa, GDb filled into the concave portion RE of the frames 61a, 61b and configured to conduct the heat of the display elements 11a, 11b to the frames 61a, 61b. In this case, in the image display device 200, sufficient heat dissipation is ensured by conducting the heat of the display elements 11a, 11b to the frames 61a, 61b by the grease-like heat dissipation materials GDa, GDb. In addition, by adopting the grease-like member as the heat conduction medium, the conduction of noise generated by the display elements 11a, 11b is suppressed. In other words, in the image display device 200, the conduction of noise generated by the display elements 11a, 11b is suppressed by interposing a material having low conductivity during heat conduction.

MODIFIED EXAMPLES AND OTHERS

The present disclosure is described according to each of the above-described embodiments, but the present exemplary disclosure is not limited to the above-described embodiments. The present exemplary disclosure may be carried out in various modes without departing from the gist of the present disclosure, and, for example, the following modifications may be carried out.

The imaging optical system 20 incorporated into the first display unit 100a is not limited to that illustrated, and may have various configurations. Specifically, the imaging optical system 20 described above is the off-axis optical system OS that is asymmetric in the Y direction or the longitudinal direction, but may also be an off-axis optical system that is asymmetric in the X direction or the lateral direction. The optical elements constituting the imaging optical system 20 are merely exemplary in FIG. 9, and changes can be made, such as increasing or decreasing the number of lenses, adding a light-guiding member, etc.

A light control device that controls light by limiting the transmitted light of the combiners 103a, 103b can be attached on an external side of the combiners 103a, 103b. The light control device adjusts a transmittance, for example, electrically. Mirror liquid crystals, electronic shades, etc. may be used as the light control device. The light control device may adjust a transmittance according to outside light brightness.

The combiner 103a, 103b may be replaced with a mirror having light blocking properties. In this case, the optical system is a non-see-through type optical system that does not assume direct observation of an external image.

The first frame 61a, the second frame 61b, and the fixing member 78 are not limited to being formed from a metal material, and may be formed from fiber-reinforced plastic (FRP).

The structure of the coupling members 81, 82 is not limited to one having a ball joint shape, and can be replaced with various mechanisms having increased rotational degrees of freedom along two or more axes.

In the description above, although it was assumed that the image display device 200 was worn on the head and is used, the image display device 200 may also be used as a handheld display that is not worn on the head and is to be looked into like binoculars. In other words, the head-mounted display also includes a hand-held display in the present disclosure.

In the above-described aspect, the heat dissipation material SDa, etc. may be disposed between the left and right display units 100a, 100b, and may be configured to suppress the conduction of noise generated by the display elements 11a, 11b to the circuit board 91 that controls the display operation.

In the above, the light is guided in the vertical direction or the Y direction, but a configuration in which the light is guided in the horizontal direction or the X direction is also possible.

Note that, the image display device 200 for both eyes is used in the above description, but for the image display device 200, one of the portions for the right eye and the portion for the left eye can be omitted. In this case, it becomes a monocular head-mounted display.

Further, in the above-described aspect, it is also conceivable to extend the first sheet type heat dissipation material SDa attached to the display element 11a, the first cover member heat dissipation material CDa attached to the first cover member 71a, etc., to the upper exterior member 107a and the lower exterior member 107b made of a resin material, to conduct heat to the upper exterior member 107a and the lower exterior member 107b.

In addition, in the example of FIG. 5, the first sheet type heat dissipation material SDa and the second sheet type heat dissipation material SDb are extended and attached in both left and right directions (the +X direction and the −X direction) from the first display element 11a and the second display element 11b, however, it is also conceivable to extend them in either direction. Note that by extending in the left-right direction and opening in the upper direction (+Y direction), the FPC (flexible printed circuit) of the first display element 11a and the second display element 11b, which are not illustrated, can be extended in this direction to avoid interference from the first sheet type heat dissipation material SDa, etc.

In the above, the cover member heat dissipation materials CDa, CDb do not overlap with the sheet type heat dissipation materials SDa, SDb. However, if the occurrence of noise, for example, can be suppressed, the first sheet type heat dissipation material SDa and the cover member heat dissipation material CDa may be joined together to accelerate the time of heat transfer (increase the performance of heat conduction).

A first image display device according to a specific aspect includes a display element including a light emitting portion of imaging light, an optical system configured to emit imaging light from the display element, a resin-made cover member configured to cover the optical system, and a sheet type heat dissipation material attached from the cover member to the display element and configured to conduct heat of the display element to the cover member.

In the above-described image display device, sufficient heat dissipation is ensured by conducting the heat of the display element to the cover member by the sheet type heat dissipation material. In addition, a resin is used as the cover member that is the heat dissipation destination, that is, a material having low electrical conductivity is interposed during heat conduction, whereby, conduction of noise generated by the display element is suppressed.

In a specific aspect, the display element includes a first display element configured to generate first imaging light as imaging light, and a second display element configured to generate second imaging light as imaging light, wherein the sheet type heat dissipation material includes a first sheet type heat dissipation material configured to conduct heat of the first display element, and a second sheet type heat dissipation material configured to conduct heat of the second display element. In this case, the first imaging light and the second imaging light allow for binocular vision image formation.

In a specific aspect, a first display unit including a first display element and configured to display an image by first imaging light, a second display unit including a second display element and configured to display an image by second imaging light, and a fixing member configured to fix the first display unit and the second display unit relative to each other are included, wherein the fixing member has a shape configured to rotate the first optical system and the second optical system in rotational directions around two or more axes when the first display unit and the second display unit are aligned prior to fixing. In this case, the fixing member has a shape configured to rotate the first optical system and the second optical system in rotational directions around two or more axes, thus, prior to fixing, the first display unit and the second display unit can be disposed and aligned at a high degree of freedom with respect to the fixing member. Note that after alignment, the first display unit and the second display unit are fixed to the fixing member using an adhesive material or a fastener, so that these relative positional relationships can be stably maintained.

In a specific aspect, a metal frame configured to support the optical system is included, wherein the sheet type heat dissipation material is separated from the frame. In this case, conduction of noise generated by the display element to the frame via the sheet type heat dissipation material can be avoided.

In a specific aspect, the frame includes a concave portion into which a portion of the display element is inserted. In this case, the position of the display element can be adjusted.

In a specific aspect, a grease-like heat dissipation material filled into the concave portion of the frame and configured to conduct the heat of the display element to the frame is included. In this case, heat conduction by the grease-like heat dissipation material is possible.

In a specific aspect, the cover member includes a cover member heat dissipation material provided along the optical system on the outer surface of the cover member, the cover member heat dissipation material being configured to accommodate the optical system therein and conduct heat of the cover member. In this case, the cover member heat dissipation material avoids or suppresses the increase in the temperature of the optical system contained inside the cover member, whereby distortion, etc. of the image are suppressed.

In a specific aspect, the sheet type heat dissipation material is a graphite sheet. In this case, high efficiency heat conduction is possible.

A second image display device according to a specific aspect includes a display element including a light emitting portion of imaging light, an optical system configured to emit imaging light from the display element, a metal frame including a concave portion into which a portion of the display element is inserted, the metal frame being configured to support the optical system, and a grease-like heat dissipation material filled into the concave portion of the frame and configured to conduct heat of the display element to the frame.

In the above-described image display device, sufficient heat dissipation is ensured by conducting the heat of the display element to the frame by the grease-like heat dissipation material. In addition, a grease-like member is used as the heat conduction medium, that is, a material having low electrical conductivity is interposed during heat conduction, whereby, conduction of noise generated by the display element is suppressed.

In a specific aspect, an insulating member is provided between the frame and the optical system. In this case, it is possible to block or suppress the heat conducted to the frame from flowing toward the optical system by the heat insulating member.

What is claimed is:

1. An image display device comprising:
    a first display that emits a first imaging light;
    a first optical member that emits the first imaging light from the first display;
    a first cover that defines an inner space in which the first optical member is disposed, and covers the first optical member over at least two sides thereof;
    a combiner configured to direct the first imaging light from the first optical member towards a user; and
    a first heat dissipation material that is directly attached to the first display, and that extends from the first cover to the first display and that conducts heat of the first display to the first cover,
    wherein the first cover is directly attached to the first heat dissipation material, but does not cover the first heat dissipation material.

2. The image display device according to claim 1, further comprising:
    a second display that emits a second imaging light;
    a second optical member that emits the second imaging light from the second display;
    a second cover that covers the second optical member; and
    a second heat dissipation material that extends from the second cover to the second display and that conducts heat of the second display to the second cover.

3. The image display device according to claim 2, further comprising a fixing member that fixes the first display and the second display to each other, wherein the fixing member has a shape that rotates the first display and the second display in rotational directions around two or more axes.

4. The image display device according to claim 1, further comprising a frame that supports the first optical member, wherein the first heat dissipation material is separated from the frame.

5. The image display device according to claim 4, wherein the frame includes a concave portion into which a portion of the first display is inserted.

6. The image display device according to claim 5, further comprising a heat dissipation material that is filled into the concave portion of the frame, and that conducts heat of the first display to the frame.

7. The image display device according to claim 1, further comprising a cover heat dissipation material that is provided at a surface of the first cover along a direction from the first display toward the first optical member, the cover heat dissipation material that dissipates heat of the first cover.

8. The image display device according to claim 1, wherein the first heat dissipation material is a graphite sheet.

9. The image display device according to claim 1, further comprising:

a frame that includes a concave portion into which a portion of the first display is inserted and that supports the first optical member, wherein grease is filled into the concave portion of the frame, the grease being another heat dissipation material that conducts heat of the first display to the frame.

10. The image display device according to claim 9, further comprising a heat insulating member between the frame and the first optical member.

11. The image display device according to claim 1, wherein the first display is disposed so as to close an opening of the first cover.

12. The image display device according to claim 1, further comprising a second heat dissipation material, the second heat dissipation material being directly attached to a different side of the first cover than the first heat dissipation material.

* * * * *